Oct. 29, 1935. E. J. W. RAGSDALE 2,019,272
AEROFOIL AND METHOD OF MAKING SAME
Filed June 23, 1931
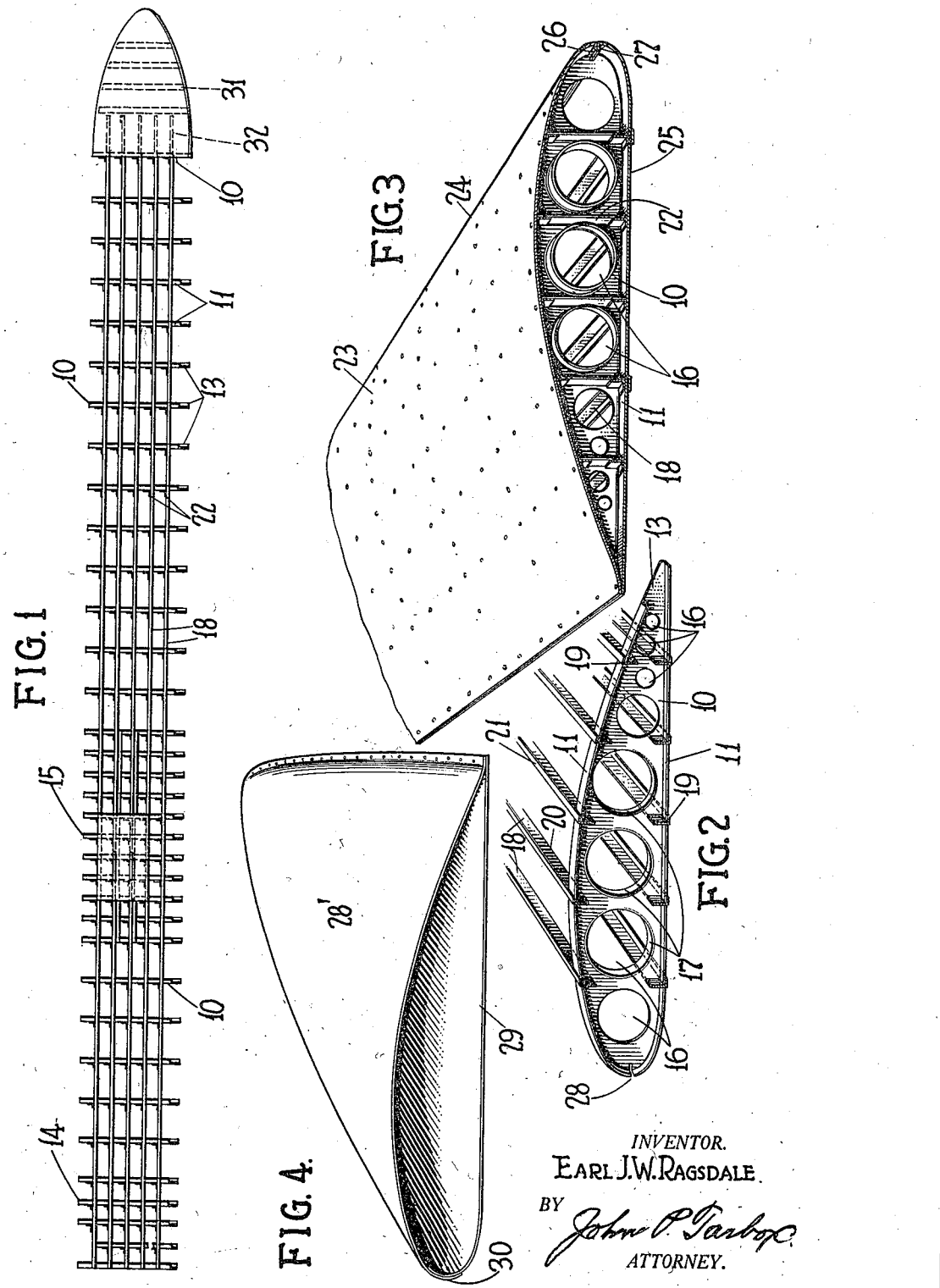
INVENTOR.
EARL J.W. RAGSDALE
BY
ATTORNEY.

Patented Oct. 29, 1935

2,019,272

UNITED STATES PATENT OFFICE 2,019,272

AEROFOIL AND METHOD OF MAKING SAME

Earl J. W. Ragsdale, Norristown, Pa., assignor to Edward G. Budd Manufacturing Company, Philadelphia, Pa., a corporation of Pennsylvania Application June 23, 1931, Serial No. 546,220

6 Claims. (Cl. 244—31)

The invention relates to aerofoils and in particular to the construction and method of manufacture thereof.

It is an object of the invention to construct an aerofoil which is extremely light, and yet of great strength, one that lends itself readily to the method of manufacture including assembly by spot welding, and one which can be built up from simple stampings or rolled sections made from strip stock.

Other and further objects and advantages of the invention will appear from the following detailed description when read in connection with the drawing forming a part hereof.

In the drawing:—

Fig. 1 is a plan view of an aerofoil framework according to my invention adapted for use as the blade of a gyrating lift surface.

Fig. 2 is an enlarged detail view of the frame in perspective showing the longitudinal members in transverse section.

Fig. 3 is a view corresponding to Fig. 2 but showing the skin applied.

Fig. 4 is a view in perspective of an end cap which may be used.

According to my invention I form the fore and aft members 10 of the aerofoil framework of simple one piece stampings of light gauge stock which lends itself readily to spot welding, such as stainless steel stock. These members 10 are formed with a transverse flange 11 along their top and bottom edges and at the trailing edge. The flange 11 is omitted, as indicated at 13, for a purpose presently to be described.

These fore and aft frame members or ribs are suitably spaced from each other, depending on the strength required in the particular location. At the inner end 14 where the blade is to be attached to a hub member, they are shown more closely spaced, as also at an intermediate position 15 where a brace (not shown) is to be secured.

To lighten these members 10 they are provided with a series of holes 16 from front to rear, the size of the holes varying with the height of the member in the region of the hole. To add strength, certain of these holes 16 are flanged within margins, as indicated at 17, in a direction opposite to the flanges 11.

To provide for the fastening of longitudinal members, as 18, which may, for the sake of simplicity, be of simple angle section, the ribs 10 are formed in their upper and lower edges with a series of kerfs 19 corresponding to the number of longitudinals employed to tie them together. One arm, as 20, of the longitudinals is inserted in the corresponding kerfs of the ribs seated in a suitable jig and the other arm 21 which overlaps the flanges 11 of the ribs, is spot welded thereto.

The joint is further strengthened by vertical angle members, as 22, having one arm welded to the body or web of a rib 10 and its other arm which overlaps vertically opposed longitudinal members 18 is spot welded to the arms 20 of said members. With the parts suitably jigged, it will be seen that the entire framework may be readily and quickly assembled by a spot welding operation. The framework, as so connected, has very little rigidity as respects twisting, but it obtains this rigidity and strength by the application of the skin in the manner now to be described.

The skin, designated generally by numeral 23, is also made of light gauge metal, and for ease of application by the method, it is made for the most part into separate upper and lower portions 24 and 25, these portions being flanged inwardly at their forward edges at 26 and 27, and spot welded together along these flanges.

The ribs are curved at the front in accordance with a usual aerofoil section and provided with kerf 28 wide enough to receive within them the double flange 26, 27. In the assembly of the skin to the frame the lower section of the skin, as 25, is applied first, although the reverse arrangement may also be followed. Its flange 27 is placed within the front kerfs 28 of the ribs and the skin is then spot welded as indicated in Fig. 3 to both the longitudinals 18 and to the flanges 11 of the ribs. The upper portion 24 of the skin is then applied by inserting its flange 26 into the kerfs 28 and the flanges 26, 27 of the two sections of skin are spot welded together. Subsequently by suitable welding tongs reaching over the width of a sheet, the top skin portion 24 is progressively spot welded to the longitudinals and transverse ribs from the leading edge to the trailing edge. The flange 10 being cut away at 13, permits more ready access of the welding tongs, when welding the top section 24 of the skin to the rib and longitudinals near the trailing edge. Finally the overlapping rear edges of the upper and lower skin sections 24 and 25 are spot welded together. So joined together the framework and skin cooperate to provide a very strong, rigid and durable construction, and one which, at the same time, is very light in weight and hence does not develop undesirably severe centrifugal stresses, when used as a blade of a gyrating lift surface.

An alternative method of applying the skin sections to framework, and perhaps a preferable one, is to first weld together the front edge flanges 26, 27, then applying the skin to the frame so as to locate the double flange 26, 27 in the front kerfs of ribs, then spot welding the lower section 25 to the framework, while the upper section is bent upwardly and forwardly out of the way, then progressively welding the upper section 24 to the frame from front to rear, and finally welding the rear edges of the sections 24, 25 to each other.

At the tips, the inner reinforcement of the skin need not be so strongly interbraced, and these tips are constructed of upper and lower skin sections 28 and 29 lap welded at their forward edges as indicated in Fig. 4 at 30. At their rear edges they overlap in the same direction as does the main body of the skin, and are secured together by spot welding. The skin is reinforced by a series of spaced rib sections 31 indicated in Fig. 1 in dotted lines, these ribs being spot welded to the skin in the manner of joining the main sections of the skins to the ribs. Appropriately shaped welding tongs are used in this assembly. The inner rib 31 is spaced from the mouth of the tip a considerable distance so as to allow the ends of the longitudinals to telescope a considerable distance within the tip portion of the skin to be spot welded thereto, to strongly secure the tip to the longitudinals. Preferably the edge of the open mouth of the tip cover overlaps the last rib which is strongly connected to the longitudinals in the manner already described, and is spot welded thereto.

It will be understood that the tip portions are secured in place before the main skin sections 24 and 25 are secured in the manner already described.

While I have herein described a specific construction and method of assembly, it will be understood by those skilled in the art that departures may be made from the precise construction and method described, without departing from the spirit and scope of the invention as expressed in the claims appended hereto.

What I claim is:

1. An aerofoil comprising one piece spaced ribs, continuous longitudinal members interconnecting said ribs at top and bottom, said ribs and longitudinals being laterally flanged and joined through said flanges at their intersections, the ribs being kerfed in their front edges, a sheet metal skin covering the opposed faces of said ribs and longitudinals, and secured thereto, and comprising top and bottom sections secured together at their rear edges and flanged rearwardly at their front edges and secured together, the joined flanges being located in said kerfs.

2. An aerofoil tip comprising a hollow skin of sheet metal having its inner end open, the skin being reinforced on its inside by spaced transverse ribs, the inner one of which is spaced from the open end, and longitudinal members telescoped into the open end of the tip and secured to the skin at top and bottom.

3. The method of assembling an aerofoil comprising transverse and longitudinal frame members and a sheet metal skin covering said framework at top and bottom, which consists in first assembling the framework, with the longitudinals projecting some distance beyond the transverse members at their outer ends, telescoping a hollow tip open at its inner end but closed in its other margins over said projecting portions of said longitudinals and securing it thereto, and finally applying the remainder of the skin to the framework in upper and lower sections, one of which is first spot welded to the frame, and the other subsequently spot welded to the frame progressively from front to rear.

4. An aerofoil comprising transverse ribs spaced longitudinally and having rounded leading edges and sharply tapered trailing edges, the ribs having perimetral flanges, a leading edge kerf and kerfs along the perimeter, the ribs also having web openings dimensioned according to the vertical dimension of the ribs, certain of which openings are surrounded by perimetral flanges, longitudinals in said perimetral kerfs, braces against the ribs and adjacent longitudinals, skins flanged together in said leading edge kerfs and bent back over ribs to laminated relation at the trailing edge, and a tip including skins lapped about the leading edge and a laminated trailing edge, and lapped over said longitudinals.

5. An aerofoil comprising transverse ribs spaced longitudinally and having rounded leading edges and sharply tapered trailing edges, the ribs having perimetral flanges, a leading edge kerf and kerfs along the perimeter, longitudinals in said other edge kerfs, skins flanged together in said leading-edge kerfs, and a tip lapped over said longitudinals.

6. An aerofoil, for end mounting on a rotatable hub, comprising transverse ribs spaced longitudinally closer to each other at positions near the hub end and at a brace position outwardly therefrom than between said positions and the outer end, the ribs having rounded leading edges, sharply tapered trailing edges and perimetral flanges, the upper of which flanges is short of the rear end of the lower flange, the ribs also having leading edge kerfs, and kerfs spaced along the top and bottom perimeters, the ribs also having a series of holes in the web between the flanges of diameters according to the vertical dimension of the ribs and certain of said holes being surrounded by perimetral flanges, longitudinals of angle section in said edge kerfs, braces of angle section against the rib webs and the adjacent longitudinals, upper and lower skins flanged together in said leading-edge kerfs and bent back over the ribs and longitudinals to laminated trailing edges, a tip including upper and lower skins lapped about a rounded leading edge and having a laminated trailing edge, said tip including transverse ribs and being fitted along the longitudinals.

EARL J. W. RAGSDALE.